United States Patent
Komoto et al.

[11] 3,742,049
[45] June 26, 1973

[54] METHOD FOR PRODUCING BIS (4-AMINOCYCLOHEXYL) ALKANE

[75] Inventors: Hiroshi Komoto; Fusakazu Hayano, both of Saitamaken; Toshio Takami, Tokyo, all of Japan

[73] Assignee: Asahi Kasei Kabushiki Kaisha, Kitaku, Osaka, Japan

[22] Filed: Oct. 9, 1970

[21] Appl. No.: 79,469

[30] Foreign Application Priority Data
Oct. 16, 1969   Japan.................... 44/82253

[52] U.S. Cl.......................... 260/563 D, 252/472
[51] Int. Cl............................ C07c 85/00
[58] Field of Search.................. 260/563 B, 563 D; 252/466 PT

[56] References Cited
UNITED STATES PATENTS
3,244,644   4/1966   Stiles.................... 252/466 PT
3,193,584   7/1965   Rylander et al........... 252/466 PT X FOREIGN PATENTS OR APPLICATIONS
619,706     3/1949   Great Britain............ 260/563 B
1,554,775   1/1969   France................... 260/563 D Primary Examiner—Lewis Gotts
Assistant Examiner—D. R. Phillips
Attorney—James E. Armstrong and Ronald S. Cornell

[57] ABSTRACT

A bis(4-aminocyclohexyl)alkane represented by the general formula

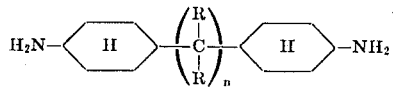

wherein R is hydrogen, or a methyl or ethyl group and $n$ is 1 or 2, is made by the hydrogenation of a bis(4-nitrophenyl)alkane represented by the general formula

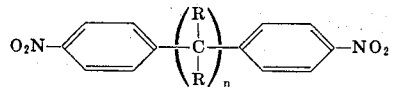

wherein R and $n$ are defined above, in the presence of ruthenium oxide which shows an amorphous pattern by X-ray diffraction, aqueous ammonia or liquid ammonia and an organic solvent, at a reaction temperature of 110° – 170°C, preferably 130° – 140°C under an elevated hydrogen pressure. In this method, the proportion of the resultant three kinds of stereoisomers can be varied in a wide range.

5 Claims, 2 Drawing Figures

Patented June 26, 1973 3,742,049

METHOD FOR PRODUCING BIS (4-AMINOCYCLOHEXYL) ALKANE

BACKGROUND OF THE INVENTION

The production of a bis(aminocyclohexyl)alkane from a bis(nitrophenyl)alkane by hydrogenation is known from the specification of French Pat. No. 1,554,775. In this French patent a method is disclosed in which a ruthenium compound, such as ruthenium dioxide, ruthenium-alumina, ruthenium-silica, ruthenium-carbon or the like is used. When such ruthenium compounds are used as a catalyst, the reaction must be carried out at a temperature higher than 170°C, preferably higher than 200°C in order to drive the reaction to substantial completion.

Since the reaction is exothermic, it is necessary to use low concentrations of reactant in order to achieve a reaction temperature as high as 200°C. Accordingly, if it is possible to effect the reaction at a temperature lower than 170°C, the reaction could be carried out safely at a higher concentration. Thus the advent of a catalyst which permits the use of such a low temperature reaction is very desirable.

Accordingly, it is an object of the present invention to provide a method for producing a bis(4-aminocyclohexyl)alkane at a temperature lower than that of any of conventional methods by increasing the activity of the catalyst.

Further, it is well known that there are three kinds of stereoisomers; trans-trans, cis-trans and cis-cis for bis(-4-aminocyclohexyl)methane. We have confirmed that the cis bond due to the presence of trans-cis and cis-cis stereoisomers exists in addition to the already known trans-trans stereoisomers.

As is well known, a high-melting polyamide can be obtained from bis(4-aminocyclohexyl)methane or bis(4-aminocycloehxyl)ethane and dodecanedioic acid. It is known that the properties of the polyamide produced from bis(4-aminocyclohexyl)methane and dodecanedioic acid varies according to the proportion of stereoisomers.

We have found that the variation of the proportion of stereoisomers in bis(4-aminocyclohexyl)ethane greatly influences the properties of polyamide produced from bis(4-aminocyclohexyl)ethane and dodecanedioic acid.

Accordingly, it is another object of the present invention to provide a method in which the proportion of stereoisomers of resultant diamine can be controlled over a wide range.

SUMMARY

The present invention provides a method for producing a bis(4-aminocyclohexyl)alkane represented by the general formula

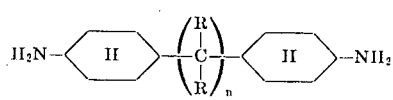

wherein R is hydrogen, or a methyl or ethyl group and n is 1 or 2 which comprises hydrogenating a bis(4-nitrophenyl) alkane represented by the general formula

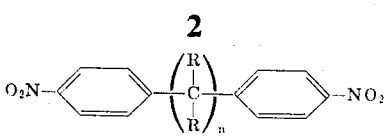

wherein R and n are defined above in the presence of a ruthenium oxide which shows an amorphous pattern by X ray diffraction, aqueous ammonia or liquid ammonia and an inert organic solvent, at a reaction temperature of 110° –170°C, preferably 130°– 140°C, under the atmosphere of pressurized hydrogen.

BRIEF DESCRIPTION OF THE DRAWING

These and other objects, features and advantages of the present invention will become more readily apparent from the following detailed description when taken in conjunction with the accompanying drawing wherein.

DETAILED DESCRIPTION

Figure 1:
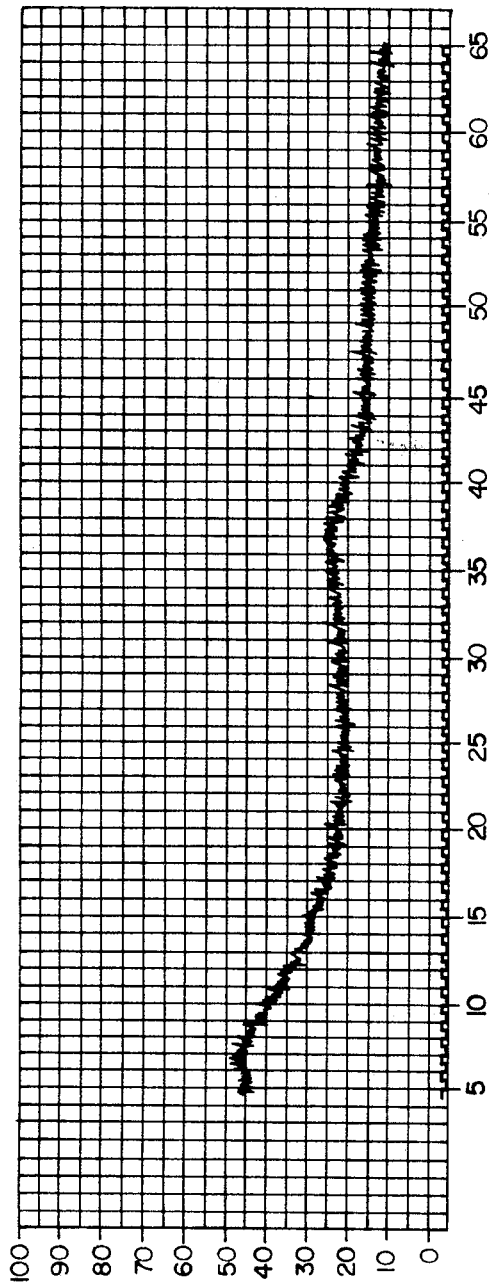
FIG. 1 depicts an X-ray diffraction pattern of an amorphous catalyst according to the present invention.

The control of the proportion of stereoisomers of diamine to a desired value in a certain range by the proper selection of reaction temperature according to the present invention has never been achieved by conventional methods and thus the industrial significance of the effect obtained by the present invention is considerable.

Among the bis(4-nitrophenyl)alkanes used in the present invention, bis(4-nitrophenyl)ethane can be produced quantitatively by bubbling air through p-nitrotoluene in methanol by using NaOH at a temperature lower than 40°C. In this case, a small amount of 4,4'-dinitrostilben is formed but its presence is not harmful.

The amorphous type ruthenium oxide used in the method of the invention is a precipitate obtained by neutralizing an aqueous solution of ruthenium chloride with an alkali while being careful so as not to cause a sudden change in the pH of the system or by neutralizing an aqueous solution of an alkali salt of ruthenium acid with an acid while being careful so as not to cause a sudden change of its pH. The water-containing ruthenium oxide which shows an amorphous pattern in X-ray diffraction is dehydrated by removing water from the precipitate by drying under a reduced pressure at a temperature lower than 130°C. It is possible to spread amorphous type ruthenium oxide on a carrier such as active carbon, silica gel, alumina, or the like if necessary.

In the method of the present invention, 0.01 percent to about 10 percent by weight per raw material, preferably 0.2 percent to 1.0 percent by weight of catalyst is used.

In order to provide diamine in a desirable proportion of stereoisomers by the method of the present invention, a high yield can be obtained if the reaction is carried out by using the amorphous ruthenium catalyst in the presence of aqueous ammonia and an inert organic solvent under a hydrogen pressure of more than 50 kg/cm² and less than 200 kg/cm² at a temperature of higher than 110°C and lower than 170°C.

The hydrogen pressure should be in the range of 50 kg/cm² to 200 kg/cm² preferably 100 kg/cm² to 150 kg/cm² from the view point of reaction velocity. Reaction temperatures higher than 170°C, are not preferable because the proportion of stereoisomers of diamine is not suitable, and, in subsequent use, the melting point of polyamide obtained by the reaction with dodecanedioic acid is higher than 300°C. Even when the reaction temperature is lower than 110°C, the reaction proceeds but does not go completion within an economically feasible time. In the present invention, it is necessary to use aqueous ammonia or liquid ammonia. Liquid ammonia has been used in this kind of reaction in the prior art but it has been found that any concentration of ammonia from 100 percent by weight to several percent by weight is useful in the present invention. It has been also found that aqueous ammonia is more effective than liquid ammonia from the standpoint of yield, etc. The amount of ammonia to be used is preferably in the range of 1 – 100 percent by weight in the form of $NH_3$ per weight of the reaction raw materials. There is no theoretical upper limit on the amount of ammonia and 200 percent by weight or more can be used, but 5–40 percent by weight is the most practical.

The inert solvent used in the present invention must be one which is not hydrogenated under the conditions used in the reaction. In general, saturated aliphatic straight chain hydrocarbon, cyclic hydrocarbon, oxygenated saturated aliphatic straight chain hydrocarbon containing ether or hydroxy group, or oxygenated cyclic hydrocarbon containing ether or hydroxy group is suitable. In these hydrocarbons, number of carbon atoms are less than 20. Illustrative solvents are, n-hexane, cyclohexane, dioxane, ethyl ether, n-butyl ether, isobutyl ether, amyl ether, tetrahydrofuran, dioxolan, dicyclohexyl ether and the like, lower alcohols such as methyl alcohol, ethyl alcohol, isopropyl alcohol and n-butyl alcohol are also useful. A mixture of more than one solvent can be used. The use of about 0.5 parts to about 2 parts by weight based on the reactant is preferable. Of course, excess solvent up to the extent of about 10 to 20 parts by weight can be used, but such amounts only dilute the reaction mixture and this effectiveness is only for removing reaction heat.

During hydrogenation, the raw materials are hydrogenated completely to the extent of the hydrogenation of benzene nucleus. In other words, hydrogenation is carried out to substantial completion i.e. the nitro group connected directly to benzene nucleus is hydrogenated to an amino group and the benzene nucleus is hydrogenated to saturation (more than 99.99 percent).

Because the present reaction is exothermic, the removal of reaction heat at a high temperature is difficult. Accordngly, if the reaction is continued for several hours, decomposition often occurs. By the method of the present invention, it is possible to reduce decomposition effectively and to increase yields by carring out reaction at a temperature lower than that of conventional methods for 5 – 120 minutes. The proportion of stereoisomers to a desired value is controlled by the selection of proper reaction temperature.

The present invention has the further advantage that undesirable tarry matter or other condensation products are not produced in significant amounts.

The method of the present invention can be carried out as a batch or continuous operation.

The methods of preparing the catalyst useful in the present invention are as follows; parts and percents are by weight.

Method 1 for preparing the catalyst.

262 parts of $RuCl_3 \cdot 3H_2O$, 200 parts of water and 2 parts of 12N-HCl are dissolved in a reactor equipped with a stirrer, a thermometer and a pH meter. The mixture is neutralized with NaOH to pH 8 at room temperature while taking care so as not to cause a sudden change in pH. The resultant precipitate is filtered, washed with water and then the water is replaced by acetone. It is then dried at 110°C for 8 hours. The X-ray diffraction pattern of the dried product is shown in FIG. 1.

Method 2 for preparing the catalyst.

523 parts of $RuCl_3 \cdot 3H_2O$, 250 parts of KOH and 250 parts of $KNO_3$ are melted by heating in a nickel crucible for 2 hours. After being allowed to cool by standing, the mixture is dissolved in 700 parts of water. 3,600 parts of active carbon is immersed in this solution which is then left to stand for 18 hours. Thereafter the solution is neutralized to pH 6 with 6N-HCl. After washing with distilled water until $Cl^-$ ion is removed by using a suction filter, a catalyst is obtained by drying the washed precipitate at 110°C for 8 hours. The X-ray diffraction pattern of resultant catalyst was almost the same with that of FIG. 1.

Our invention is further illustrated by following examples. All percentages and parts are by weight.

Example 1

A solution containing 125 of bis(4-nitrophenyl)ethane in 75 ml dioxane and 3 g of 28 percent aqueous ammonia was hydrognated with an active carbon catalyst containing 5 percent of amorphous ruthenium oxide for a retention time of 60 minutes under a hydrogen pressure of 150 kg/cm² in a high pressure vessel. The resultant product was separated from the catalyst by filtration and then solvent and water were removed by distillation. Hydrogenated completely saturated bis(4-aminocyclohexyl)ethane was obtained as a top product.

The yields of product (percent) and proportions of stereoisomers vs. hydrogenation temperature are shown in Table 1. In this table, the proportions of stereoisomers are expressed by the stereoisomers with respect to one cyclohexane ring. Namely, the proportions are expressed with the assumption that the trans-trans product corresponds to the 2 trans, the trans-cis product corresponds to the 1 trans and the 1 cis and the cis-cis product correspond to the 2 cis.

TABLE 1

| Reaction Temperature | Yield | Cis-type % | Trans-type % |
|---|---|---|---|
| 100°C | 50 | 61 | 39 |
| 110°C | 80 | 59 | 41 |
| 130°C | 90 | 55 | 45 |
| 150°C | 95 | 53 | 47 |
| 160°C | 95 | 41 | 59 |
| 170°C | 97 | 27 | 73 |
| 190°C | 90 | 16 | 84 |
| 230°C | 85 | 13 | 87 |

Example 2

The reactions were carried out generally according to the method of Example 1 by using various kinds of ruthenium compounds at temperatures of 150°C, 170°C and 200°C. The result is shown in Table 2.

It can be seen from the data that the ratio of cis to trans isomers is controlled directly by the reaction temperature used in the invention. The linear control of ratio of stereoisomers can be used to polyamide of controlled melting point.

TABLE 2

Figure 2:
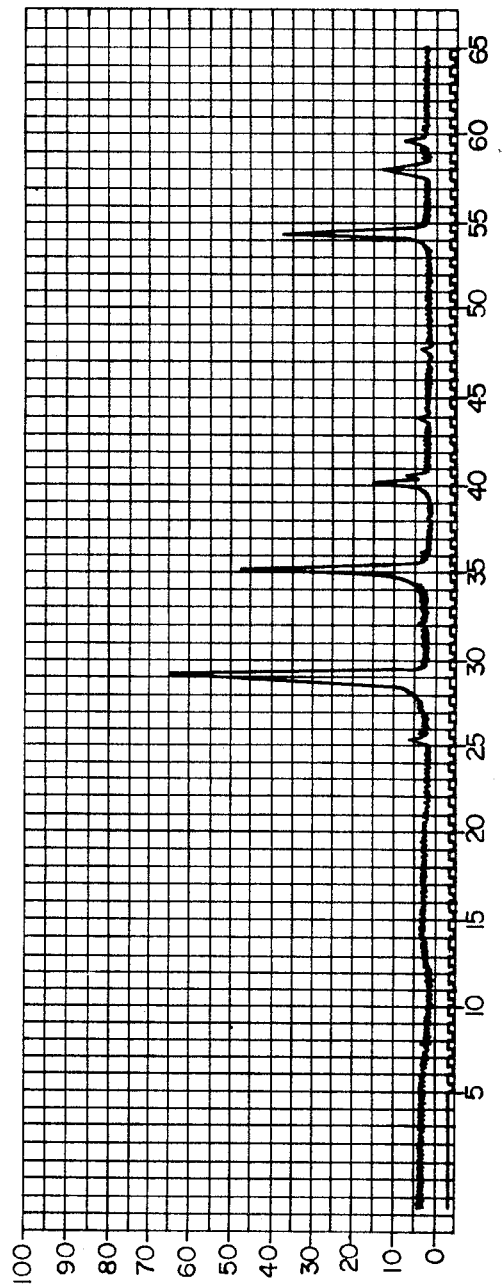
FIG. 2 shows an X-ray diffraction pattern of a non-amorphous catalyst according to the prior art.

| Ruthenium compounds (Weight %/Reactant) | Reaction temperature | Reaction time (min.) | Yield (%) |
|---|---|---|---|
| 1. Ruthenium oxide (Amorphous type) (1 %) | 150°C | 60 | 96 |
| 2. " | 170°C | 40 | 96 |
| 3. " | 200°C | 20 | 96 |
| 4. " | 230°C | 10 | 97 |
| 5. Ruthenium dioxide (shown in FIG. 2) (1 %) | 150°C | 180 | 2 |
| 6. " | 170°C | 180 | 5 |
| 7. " | 200°C | 120 | 96 |
| 8. " | 230°C | 60 | 95 |
| 9. Ruthenium-Alumina (involving 5 % of Ruthenium) (20 %) | 150°C | 180 | 2 |
| 10. " | 170°C | 180 | 3 |
| 11. " | 200°C | 120 | 95 |
| 12. " | 230°C | 60 | 95 |

According to this example it is seen that amorphous type ruthenium oxides are highly active catalysts at low temperatures.

Example 3

A solution of 125 g of bis(4-nitrophenyl)methane in 75 ml of dioxane and 20 g of 28 percent aqueous ammonia are hydrogenated in a high pressure vessel, at a temperature of 150°C, under a hydrogen pressure of 150 kg/cm² over one part of amorphous type ruthenium oxide for a retention time of 60 minutes. The resultant product was filtered to remove the catalyst and then diluted to remove the solvent and water. Hydrogenated and completely saturated bis(4-aminocyclohexyl)methane was obtained from the top of the column. The yield was 96 percent. The product was solid at room temperature, containing 52 percent trans material by analysis.

What is claimed is:

1. A method for producing a bis(4-aminocyclohexyl) alkane of the general formula

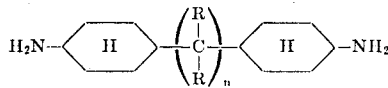

wherein R is hydrogen, a methyl group of ethyl group and $n$ is 1 or 2, which comprises hydrogenating a bis(4-nitrophenyl)-aklane represented by the general formula

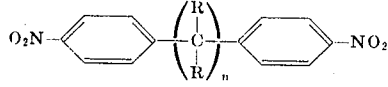

wherein R and $n$ are defined above, in the presence of a catalytic amount of ruthenium oxide which shows an amorphous pattern by X-ray diffraction, aqueous or liquid ammonia and an inert organic solvent, at a reaction temperature of 110° – 170°C under an elevated hydrogen pressure for a time period of from about 5 to 120 minutes.

2. A method of claim 1 wherein $n=2$ and R is hydrogen.

3. A method of claim 1 wherein the inert organic solvent is tetrahydrofuran.

4. A method of claim 1 wherein hydrogenation is carried out at a temperature of 130° – 140°C.

5. A method of claim 1 wherein the pressurized hydrogen has a pressure of 50 kg/cm² to 200 kg/cm² gauge.

* * * * *